March 13, 1956  D. LOUCKS  2,737,814
APPARATUS FOR BALANCING SHAFTS AND THE LIKE
Filed Feb. 23, 1952  2 Sheets-Sheet 1

INVENTOR
DONALD LOUCKS
BY
McKenna & Morsbach
ATT'YS.

March 13, 1956  D. LOUCKS  2,737,814
APPARATUS FOR BALANCING SHAFTS AND THE LIKE
Filed Feb. 23, 1952  2 Sheets-Sheet 2
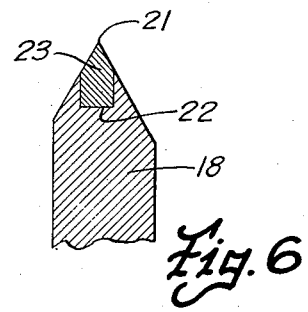
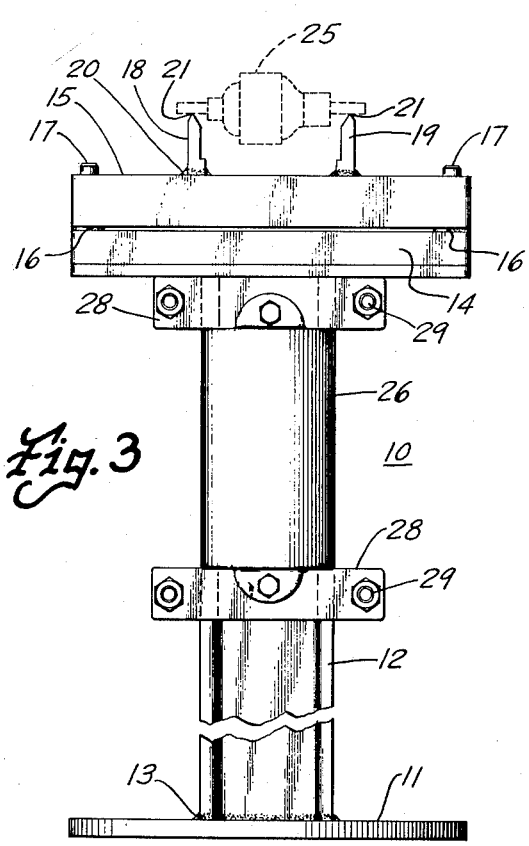
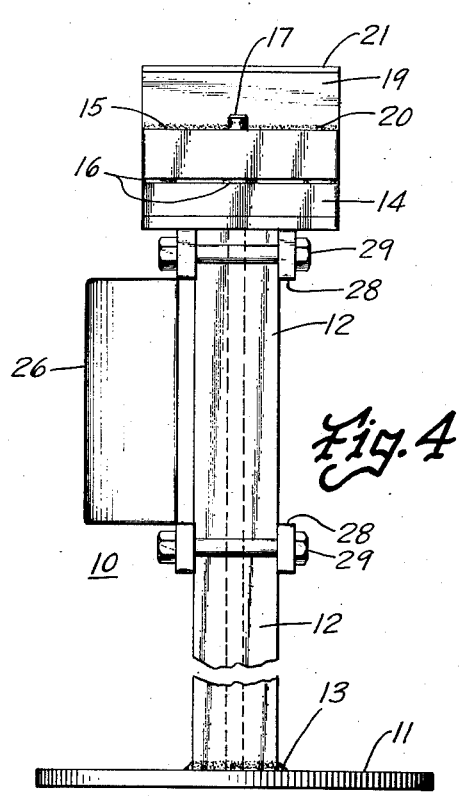
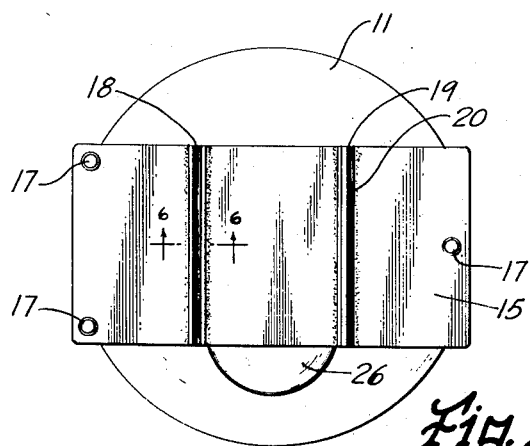
INVENTOR
DONALD LOUCKS
BY
McGenna & Morstach
ATT'YS.

United States Patent Office 2,737,814
Patented Mar. 13, 1956

2,737,814
APPARATUS FOR BALANCING SHAFTS AND THE LIKE

Donald Loucks, Palatine, Ill.

Application February 23, 1952, Serial No. 273,046

5 Claims. (Cl. 73—481)

The present invention relates to apparatus for balancing rotary shafts, rotors, and the like, in a manner so that it may be accomplished at high speed to permit mass production manufacturing and more particularly to apparatus for balancing the armatures or rotors of dynamo electric machines such as motors used in appliances and the like.

It has been customary for years in manufacturing electric motors to employ some means for balancing the armature or rotors during the manufacturing operation. Perhaps the most common method of accomplishing this resides in the use of parallel ways upon which the armature is placed with the shaft of the armature resting on the ways. The heavy side of the armature, if there is any unbalance, would then move to the bottom. Unfortunately, this method is slow, inaccurate, and consequently very costly to use in connection with the mass production of motors, which, of course, is essential with household appliances or the like where literally millions of motors are manufactured for this purpose. Additionally, precision static balancing machines have been used for this purpose. This equipment, however, has a high initial cost and a very high maintenance cost. Moreover, the time required for performing the balancing operation is substantially the same as that with the parallel way method, and thus the overall cost is much too high for mass production operation for a highly competitive product. It has also been suggested to balance rotors by mounting the rotor or armature on spaced sets of rollers supported on flat springs with means to rotate the rotor or armature at a speed in synchronism with the oscillations of the springs, which oscillations would be caused by unbalance conditions of the rotor or armature. Theoretically, this should be an excellent method of balancing rotors, but, as a practical matter, difficulties were encountered in timing the oscillations and the rotor position closely enough to permit a correct determination of unbalance. It would be desirable to provide a balancing arrangement which would have the simplicity of the parallel way arrangement, as well as the low cost thereof, and which still would give the desirable end results, namely, the high sensitivity characteristic of some of the automatic static balancing machines.

Accordingly, it is an object of the present invention to provide an improved method and apparatus for determining precision static balancing of objects such as armatures or rotors of dynamo electric machines, and the like, in which the basic principle of the parallel way arrangement is employed, but with greatly increased sensitivity.

It is another object of the present invention to provide an improved balancing apparatus for shafts having an associated mass such as armatures or rotors of dynamo electric machines by means of parallel ways but wherein difficulty from oil, lint or other foreign material on the ways or armature journals is completely eliminated.

It is a still further object of the present invention to provide an improved balancing device for armatures of dynamo electric machines which is simple and completely foolproof in operation and which will give years of satisfactory operation.

Further objects and advantages of the present invention will become apparent as the following description proceeds and the features of novelty which characterize this invention will be pointed out with particularity in the claims annexed to and forming a part of this specification.

For a better understanding of the present invention, reference may be had to the accompanying drawings in which:

Fig. 3 is an elevational view of the arrangement shown in Fig. 1 with an armature shown in dotted lines and in a position to determine the balance thereof;

Fig. 4 is a view similar to Fig. 3 showing a side elevation;

Fig. 5 is a top view of the balancing device shown in Fig. 3; and

Fig. 6 is an enlarged sectional view taken on line 6—6 of Fig. 5.

Figure 1:
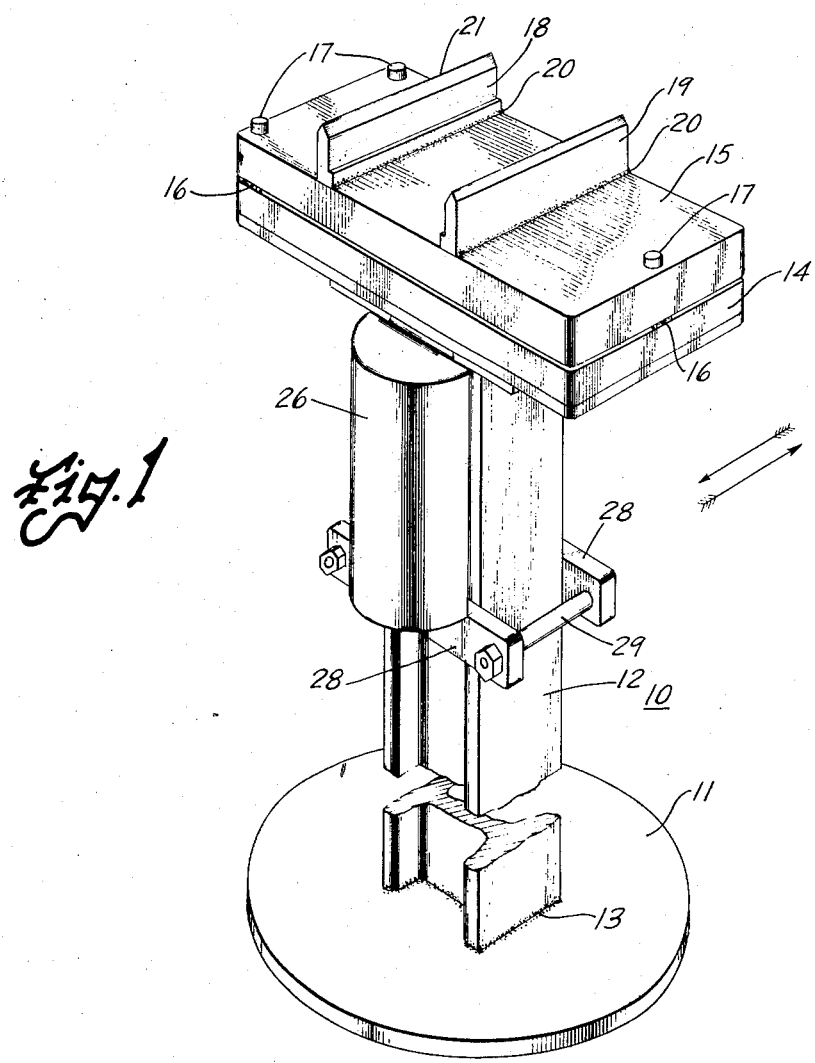
Fig. 1 is a perspective view of an automatic balancing machine embodying the present invention.

The present invention is concerned primarily with a balancing device embodying parallel ways for supporting a rotor or armature to be balanced and in which a vibrator is applied to the balancing mechanism which causes a vibration to be applied to the ways in a direction parallel to the longitudinal axes of the ways. Moreover, the vibrator is adjustably positioned with respect to a column supporting the ways, thereby to increase or decrease the magnitude of vibration produced by the vibrator relative to the ways. This vibration of the ways tends to cause a sliding action of the ways under the armature. With this vibratory action the armature does not have a tendency to roll along the ways but actually the armature stays in one place with the heavy side dropping down with practically no rocking, thus speeding up the operation. When the heavy side of the armature is determined it is removed from the ways and stock therefrom drilled away to obtain a proper balance. The rapidity of the drop of the heavy side of the armature will indicate to a skilled operator the approximate stock which must be removed, and with a little practice the operator will seldom have to do more than one recheck.

Referring now to the drawings, there is illustrated a balancing device generally indicated by the reference numeral 10 which comprises a base 11 which may be suitably secured to and supported on the floor of the shop or any other place. Extending upwardly from the base 11 is a vertical column or beam 12, specifically designated as an I beam in the drawings but obviously may comprise any other beam configuration. This beam 12 is preferably welded as indicated at 13 to the base 11. Supported on the upper end of the beam 12 is a horizontally disposed platform 14 which preferably is also welded or otherwise secured to the beam 12 in an integral manner.

For the purpose of providing a platform which is disposed in a true horizontal plane there is suitably supported on the platform 14 an adjustable platform 15, preferably supported by suitable shims 16 on a three-point support. Suitable stud bolts 17 extending through the shims 16 of the three-point support and threaded into the member 14 are provided so that the platform 15 may be adjusted to a horizontal position and yet so that it may be rigidly related to the platform 14 and the beam 12.

The platform 15 supports the balancing ways generally designated by the reference numerals 18 and 19. These ways are disposed parallel to each other and preferably rigidly related to the platform 15 by welding the ways 18 and 19 directly to the platform 15 as indicated at 20. Any other suitable means for fastening the ways to the platform 15 may, however, be employed. The construction of the ways 18 and 19 may best be observed from Fig. 6 where it is noted that the upper surface of the ways terminates in a knife edge generally designated at 21. Preferably also the knife edge 21 is formed of a hard material such as tungsten carbide or the like and to this end the ways are provided with a rectangular longitudinally extending recess 22 for receiving a tungsten carbide insert 23 having the knife edge 21. As illustrated the ways 18 and 19 terminating in the knife edges have more material thereof cut away on the adjacent faces than on the non-adjacent faces. In Fig. 3 of the drawings there is shown in dotted lines an armature 25 which is disposed on the ways 18 and 19 for balancing purposes.

Figure 2:
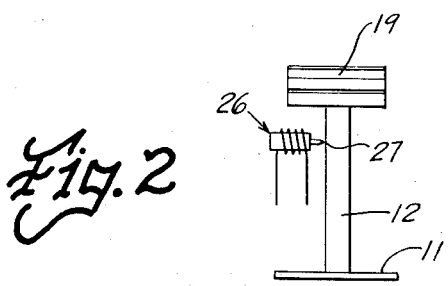
Fig. 2 is a schematic diagram of the arrangement shown in Fig. 1 to illustrate one feature of the present invention.

In accordance with the present invention there is provided a vibrator generally designated at 26 which is supported in an adjustable manner from the beam 12 so as to produce vibrations of the ways in a direction along the longitudinal axes thereof as indicated by the arrows in Fig. 1 of the drawings. Moreover, this is schematically illustrated in Fig. 2 of the drawings whereby the vibrator 26 is designated as an electromagnet having its armature 27 strike the beam 12 in a direction along the longitudinal axes of the ways 18 and 19. It should be understood that the electromagnetic vibrator shown in Fig. 2 is solely by way of example, and any other form of vibrator may be used. In an embodiment successfully built in connection with the present invention a vibrator called a Syntron vibrator was found to be very satisfactory. Any of the vibrators which may be obtained on the market extensively used for manipulating hoppers, sieves, and the like, may be employed. Since the details of construction of the vibrator 26 form no part of the present invention, no discussion thereof is included herewith. The number of vibrations per minute produced by the vibrator 26 may vary, but in one embodiment employing the present invention the vibrator operated at a frequency of 3600 vibrations per minute. An important feature of the present invention, however, resides in the adjustable positioning of the vibrator 26 relative to the beam 12. As illustrated, the vibrator 26 is provided with suitable clamping means 28, including the bolts 29 for adjustably clamping the vibrator 26 at any point along the column 12. It will be apparent that the position of the vibrator 26 will determine the amplitude of vibration produced thereby. In other words, the higher the vibrator 26 is disposed on the beam 12, the greater the vibration, and in general it is desirable to have the vibrator 26 disposed closely adjacent the table 14 as illustrated in the drawings. The beam or column 12 is preferably of a height suitable from the standpoint of the operator placing the shafts to be balanced thereon. In one embodiment built in accordance with the present invention a three foot column was employed.

In using the apparatus of the present invention a shaft with attached mass such as an armature or rotor to be balanced is placed on the ways 18 and 19 and any unbalance will tend to cause the rotor to turn with its heavy side down. Unfortunately, oil, lint and other foreign material on the ways and armature journals will deleteriously affect such balancing movement of the armature 25. However, by using the vibrator 26, the heavy side of the armature drops very quickly without interference from such foreign material. Since the direction of vibration is parallel to the balancing ways, the armature tends to stay in one place due to the weight thereof, but the vibration overcomes friction or inertia, causing the heavy side of the armature to drop quickly, with almost no rocking. Thus, the balancing operation can be performed almost as rapidly as one can place armatures on the ways 18 and 19 of the balancing machine.

When the operator determines the heavy side of the armature he also makes mental note of the rapidity with which the heavy side of the armature drops, thus telling him not only at what point the stock must be removed but also approximately how much. As a matter of fact, extensive use of applicant's invention has demonstrated that a skilled operator with very little practice will seldom have to make more than one recheck of an armature after removing the stock to restore balance.

While there has been illustrated and described but a single embodiment of the present invention, it will be understood that both the apparatus and process are subject to numerous modifications and changes which will occur to those skilled in the art and it is aimed in the appended claims to cover all such changes and modifications as fall within the true spirit and scope of the present invention.

What is claimed as new and desired to be secured by Letters Patent of the United States is:

1. A device for balancing a rotatable shaft having a mass supported thereon, comprising a vertically disposed beam member, a pair of spaced horizontally disposed way members rigidly secured to the upper end of said beam member, and vibration producing means secured to one of said members for applying vibrations to said members in a direction parallel with the longitudinal axes of said way members.

2. A balancing device for balancing a shaft having a rotor or armature supported thereon, comprising a vertically disposed beam member secured at the bottom and free to move at the top, a platform member secured to the upper end of said beam member, said platform member including an adjustable portion, means for adjusting the position of said portion for disposition in a true horizontal plane, a pair of spaced horizontally disposed ways rigidly secured to said platform portion, and vibration producing means secured to one of said members in a manner for applying vibrations to said ways in a direction parallel with the longitudinal axes thereof.

3. A device for balancing rotors, comprising a vertically disposed beam secured at the bottom and free to move at the top in the nature of a cantilever, a platform secured to the top of said beam, a pair of spaced horizontally disposed ways rigidly secured to said platform, and means secured to said beam for applying a vibration to said ways in a direction parallel with the longitudinal axes thereof, said last mentioned means being adjustably positioned at any point along said beam to vary the amplitude of vibration of said ways.

4. A device for balancing a shaft having an associated means, comprising a vertically disposed column secured at its lower end and free to vibrate at its upper end, a substantially horizontal first platform secured to the upper end of said column, a way supporting platform adjustably supported on said first platform, a pair of spaced horizontally disposed ways rigidly secured to said way supporting platform, a vibrator for applying a vibration to said ways in a direction parallel with the longitudinal axes of said ways, and means for securing said vibrator at any point along said column to control the amplitude of vibration of said ways.

5. A device for determining precision static balancing of objects such as rotatable shafts and the like, comprising a pair of spaced horizontally disposed ways each having a narrow edge along its top, whereby to support such object on both of said edges with the longitudinal axis of the object transverse to the longitudinal axes of the ways, and vibration producing means supported by said device for applying vibrations to the ways in a direction parallel with the longitudinal axes of the ways.

References Cited in the file of this patent

UNITED STATES PATENTS

| | | |
|---|---|---|
| 433,643 | Bowsher | Aug. 5, 1890 |
| 529,178 | Landgraf | Nov. 13, 1894 |
| 984,354 | Cunningham | Feb. 14, 1911 |
| 1,610,718 | Thomas | Dec. 14, 1926 |

OTHER REFERENCES

Balance by C. B. Lord, American Machinist, Aug. 27, 1931, McGraw Hill Pub. Co., Inc., pp. 331–334.